United States Patent
Chen (10) Patent No.: US 10,747,599 B2
(45) Date of Patent: Aug. 18, 2020

(54) SECURE BACKWARDS COMPATIBLE ORCHESTRATION OF ISOLATED GUESTS

(71) Applicant: Red Hat, Inc., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/984,523

(22) Filed: May 21, 2018

(65) Prior Publication Data
US 2019/0354418 A1 Nov. 21, 2019

(51) Int. Cl.
*G06F 9/54* (2006.01)
*G06F 9/455* (2018.01)
*H04L 29/08* (2006.01)

(52) U.S. Cl.
CPC .......... *G06F 9/547* (2013.01); *G06F 9/45558* (2013.01); *G06F 9/546* (2013.01); *G06F 2009/45595* (2013.01); *H04L 67/10* (2013.01)

(58) Field of Classification Search
CPC .......... G06F 9/5077; G06F 8/71; G06F 21/53; G06F 9/547; G06F 9/45533; G06F 9/546; G06F 9/45558; G06F 2009/45595; H04L 63/00; H04L 67/10; H04L 67/34
See application file for complete search history.

(56) References Cited

U.S. PATENT DOCUMENTS

| | | | |
|---|---|---|---|
| 7,222,138 B2 | 5/2007 | Fomenko | |
| 9,063,748 B1 | 6/2015 | Bakale et al. | |
| 9,063,817 B2 | 6/2015 | Dom et al. | |
| 9,396,091 B2 | 7/2016 | Bally et al. | |
| 9,830,146 B2 | 11/2017 | Rector et al. | |
| 2006/0242634 A1* | 10/2006 | Fleischer | G06F 9/44521 717/148 |
| 2014/0351815 A1* | 11/2014 | Conover | G06F 9/45558 718/1 |
| 2015/0007171 A1* | 1/2015 | Blake | G06F 9/45537 718/1 |
| 2016/0092250 A1* | 3/2016 | Wagner | G06F 9/45558 718/1 |
| 2016/0267153 A1 | 9/2016 | Witkop et al. | |
| 2017/0262308 A1* | 9/2017 | Conover | G06F 8/65 |

OTHER PUBLICATIONS

Amazon Web Services Announces Amazon API Gateway, New service makes it easy for anyone to build and run reliable, secure APIs at any scale; Jul. 9, 2015; pp. 1-3.
Kubernetes deep dive: API Service—part 1, by Stefan Schimanski and Michael Hausenblas; (https://blog.openshift.com/author/schimanskihausenblas/) Apr. 28, 2017, retrieved May 4, 2018; pp. 1-11.

* cited by examiner

*Primary Examiner* — Charles E Anya
(74) *Attorney, Agent, or Firm* — K&L Gates LLP (57) ABSTRACT

Secure backwards compatible orchestration of isolated guests is disclosed. For example, a current version of an isolated guest orchestrator instantiates an older version of the isolated guest orchestrator in a host as a dependent compute service. An application programming interface request is received. The application programming interface request is determined to be unsupported by the current version of the isolated guest orchestrator. The application programming interface request is sent to the dependent compute service. The application programming interface request is responded to based on a response from the dependent compute service.

18 Claims, 6 Drawing Sheets

SECURE BACKWARDS COMPATIBLE ORCHESTRATION OF ISOLATED GUESTS

BACKGROUND

The present disclosure generally relates to shared computing environments such as multi-tenant cloud environments. Specifically, shared computing environments, whether public or privately implemented within an organization, typically employ orchestration of the deployment of isolated guests that perform the computing tasks in the networked computer systems. Typically, computing environments face security threats that require patching to mitigate. Typically, computing systems are also periodically updated with new features, and legacy features are typically deprecated after a supported lifespan. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests enable a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware, enabling additional flexibility and scalability of deployment. Multiple containers may also be clustered together to perform a more complex function than the respective containers are capable of performing individually. In an example, a container and/or a cluster of containers may be implemented specifically to execute certain specific tasks and/or types of tasks. In a typical system, guests may be rapidly deployed through the use of image files storing ready to execute copies of the deployable guests.

SUMMARY

The present disclosure provides a new and innovative system, methods and apparatus for secure backwards compatible orchestration of isolated guests. In an example, a current version of an isolated guest orchestrator executes on a processor to instantiate a plurality of older versions of the isolated guest orchestrator in a respective plurality of hosts as a respective plurality of dependent compute services. An application programming interface request is received. Based on a determination that the application programming interface request is unsupported by the current version of the isolated guest orchestrator, the application programming interface request is sent to the a dependent compute service. The application programming interface request is responded to based on a response from the dependent compute service.

Additional features and advantages of the disclosed method and apparatus are described in, and will be apparent from, the following Detailed Description and the Figures.

DETAILED DESCRIPTION OF EXAMPLE EMBODIMENTS

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In large scale implementations, container schedulers, such as those included in container orchestrators (e.g., Red Hat® OpenShift®, Kubernetes®), generally respond to frequent container startups and cleanups with low latency. Containers may enable wide spread, parallel deployment of computing power for specific tasks. In a typical example, a container may be instantiated to process a specific task and reaped after the task is complete.

Typically, software applications are routinely updated for a variety of reasons, from new functionality, to fixing bugs, to patching security risks. In many computing environments, numerous software applications are interdependent, and many times at least some of those software applications are dependent on specific hardware components as well. These interdependent applications may typically be updated on different schedules, and may typically be designed to be operated for different length life cycles. Typically, different applications, especially those from different vendors and/or development teams, may have vastly different release and/or support life cycles. Some companies support their software for a set duration (e.g., 10 years) or for a set number of versions (e.g., 3 major releases). Developers of an application that depends on another application's output may be faced with the challenge of maintaining deprecated, retired applications that have reached their end-of-life, often times these dependent applications are not even built or designed by these developers. In addition, in many complex computing environments (e.g., enterprise corporations), certain applications performing discrete, static, key functionality may rarely, if ever, be updated. These applications may often be isolated from external networks and pose few if any security risks by themselves. However, an unknown number of other applications may depend directly or indirectly on the output of these types of legacy applications.

Typically, applications designed to interface with other applications implement some form of application programming interface ("API") which acts as defined methods of communication (e.g., subroutines, protocols, formatting standards, syntax, and other tools) implemented for applications to communicate with each other. APIs often include specifications for routines, data structures, object classes, variables, and other remote calls to an application or family of applications. These standards are typically published to allow downstream developers to take advantage of preexisting code and functionality in a system. Popular APIs such as POSIX, Windows® API, and ASPI may have immense numbers of applications that depend on certain features of the APIs being available to successfully function. In virtualized cloud environments, an orchestrator for deploying and managing virtual isolated guests in the environment may have an API that exposes key functionality for scaling compute resources. For example, requesting new guests to be instantiated may be implemented via API calls that are handled by various components of an orchestrator. In the example, additional API calls to the orchestrator, for example, to a storage controller component, may be made to provision persistent storage volumes for the isolated guests. In an example, updating software, especially when legacy functionality is deprecated and removed, is typically fraught with risk as many potentially critical applications that depend on the functionality, especially published cross application interfacing functionality such as APIs, may cease to function after the update. Typically, conflicting new functionality, and/or discovered security risks in legacy functionality may result in the retirement of legacy functionality. However, a cloud provider, for example, may have a significantly faster deployment cycle than its tenants, and so the tenants may be caught in a position where they are unable to deploy updated code in time to access the replacement functionality for a retired component (e.g., API call).

The present disclosure aims to address situations where API calls are deprecated, especially in widely shared computing components such as isolated guest orchestrators or operating systems, but where access to the deprecated functionality is still required. In an example, an orchestrator hosts several older versions of the same orchestrator on various guests. In an example, various older versions of the orchestrator may have corresponding external dependencies, for example, operating system type or version, or hardware requirements. In the example, the current, updated orchestrator then acts as an interpreter that sends unsupported API calls to one of these hosted orchestrators acting as a compute service. In an example, the compute service orchestrator nodes may connect to legacy devices, for example, legacy persistent storage volumes, with protocols that are no longer supported. In an example, these connections may be maintained and the compute services may serve as a bridge between the legacy storage devices and the guest requesting the storage. In an example, legacy data may need to be accessed for archival or audit reasons. In the examples, because API access to the legacy components is routed through the current orchestrator, security patching is not compromised, since only the newest orchestrator version deployed is directly accessible to external users. Therefore, secure backwards compatible orchestration system for isolated guests allows for agile development and deployment of shared components (e.g., isolated guest orchestrators) while still allowing legacy components to be accessed, albeit with increased latency due to extra network hops.

Figure 1:
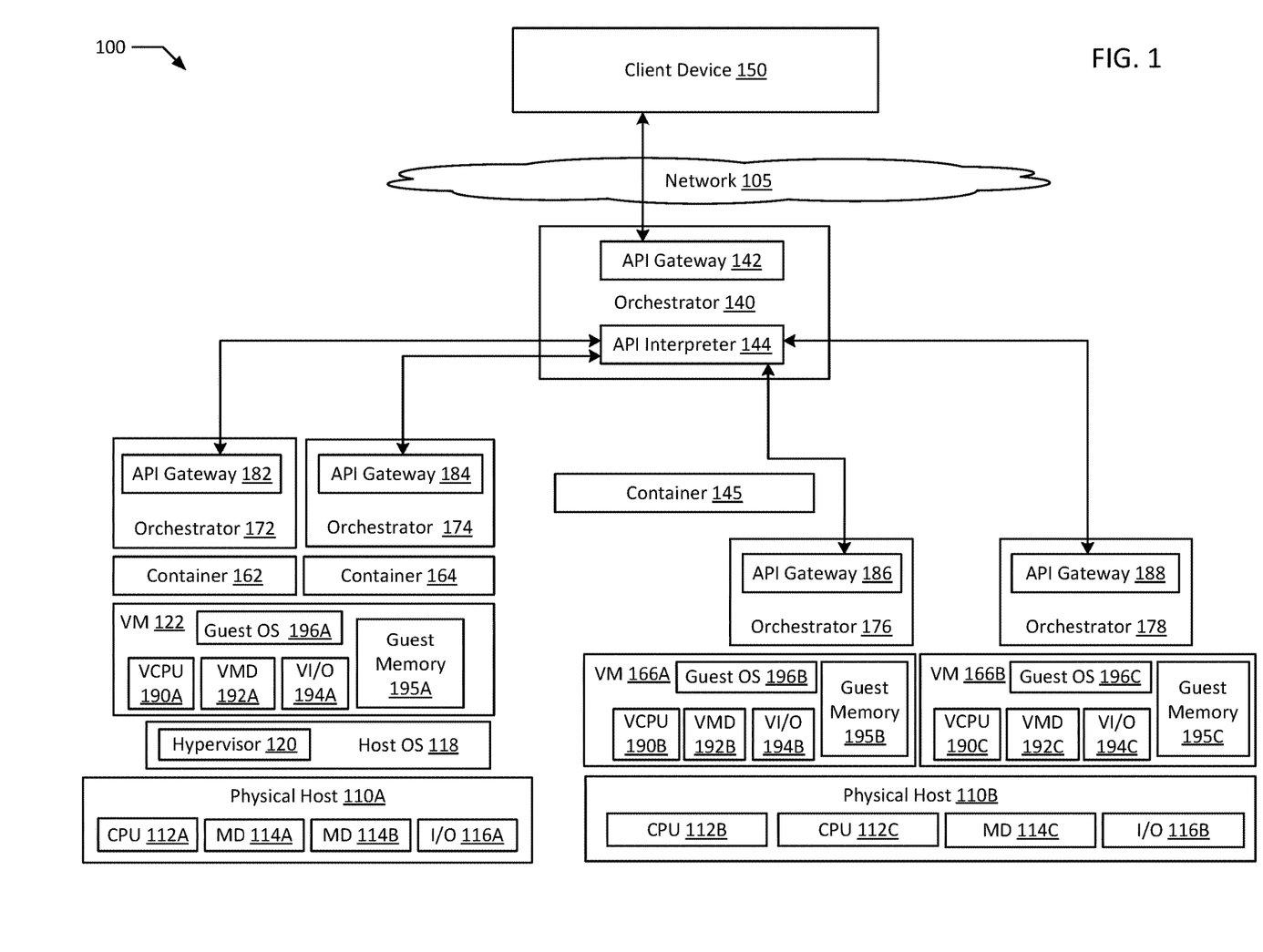
FIG. 1 is a block diagram of a secure backwards compatible orchestration system for isolated guests according to an example of the present disclosure.

FIG. 1 is a block diagram of a secure backwards compatible orchestration system for isolated guests according to an example of the present disclosure. The system 100 may include one or more physical host(s) 110A-B. Physical hosts 110A-B may in turn include one or more physical processor(s) (e.g., CPUs 112A-C) communicatively coupled to memory device(s) (e.g., MD 114A-C) and input/output device(s) (e.g., I/O 116A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-C refers to volatile or non-volatile memory devices, such as RAM, ROM, EEPROM, or any other device capable of storing data. In an example, memory devices 114A-C may be persistent storage devices such as hard drive disks ("HDD"), solid state drives ("SSD"), and/or persistent memory (e.g., Non-Volatile Dual In-line Memory Module ("NVDIMM")). Memory devices 114A-C may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A-B refer to devices capable of providing an interface between one or more processor pins and an external device, the operation of which is based on the processor inputting and/or outputting binary data. CPU(s) 112A-C may be interconnected using a variety of techniques, ranging from a point-to-point processor interconnect, to a system area network, such as an Ethernet-based network. Local connections within physical hosts 110A-B, including the connections between processors 112A-C and memory devices 114A-C and between processors 112A-C and I/O device 116A-B may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers). In an example, a container (e.g., containers 162 and 164) may be an isolated guest using any form of operating system level virtualization, for example, Red Hat® OpenShift®, Docker® containers, chroot, Linux®-VServer, FreeB SD® Jails, HP-UX® Containers (SRP), VMware ThinApp®, etc. Containers 162 and 164 may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A.

System 100 may run one or more VMs (e.g., VMs 122), by executing a software layer (e.g., hypervisor 120) above the hardware and below the VM 122, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 122 may be a virtual machine and may execute a guest operating system 196A which may utilize the underlying VCPU 190A, VMD 192A, and VI/O 194A. Processor virtualization may be implemented by the hypervisor 120 scheduling time slots on physical processors 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A.

In an example, VMs 166A and 166B may be similar virtualization implementations to VM 122, but may, for example, execute separate operating systems (e.g., guest OS 196B-C). In an example, guest OSses 196BC may be incompatible with guest OS 196A and/or host OS 118. In an example, VMs 166A-B execute on physical host 110B, with VCPU 190B-C, VMD 192B-C, VI/O 194B-C, and guest memory 195B-C virtualizing access to physical CPU 112B-C, MD 114C, and I/O 116B. In an example, container 145 is hosted on a VM (e.g., VM 166A, or one of VMs 122, 166B). In the example, container 145 is a container implemented similarly to containers 162 and/or 164. In an example, container 145 hosts orchestrator 140, which may be a virtualization orchestrator (e.g., Red Hat® OpenShift®, Kubernetes®) managing virtual compute resources for system 100. For example, orchestrator 140 may include guest schedulers for containers and/or VMs, network storage management, API management etc. In an example, orchestrator 140 is implemented via a cluster of containers instead of in a single container 145.

In an example, a secure backwards compatible orchestration system may include multiple nested orchestrators (e.g., orchestrators 172, 174, 176, and 178). In the example, orchestrators 172, 174, 176, and 178 may be flexibly hosted on a variety of physical and/or virtual hosts (e.g., containers 162 and 164, VMs 166A-B). In an example, any form of suitable network 105 for enabling communications between computing devices, for example, a public network (e.g., the Internet), a private network (e.g., a local area network (LAN) or wide area network (WAN)), or a combination thereof may be employed to connect the component parts of the system (e.g., orchestrators 140, 172, 174, 176, and 178, client device 150) to each other. In an example, orchestrator 140 may be implemented via any suitable form of computing module (e.g., application, executable, script, hardware module, etc.).

In an example, API gateway 142 is a component of orchestrator 140 that is exposed to network 105 through which client device 150 may send API calls to API exposed functionality of system 100, for example, of orchestrator 140 and/or container 145. For example, client device 150 may request additional clusters of containers to be launched by orchestrator 140 for an application managed by client device 150. In the example, the application may additionally require persistent storage to be allocated. Many computing tasks require the maintenance of persistent state information, and therefore many containers and virtual machines require network based storage. In an example, API gateway 142 exposes preconfigured software libraries associated with orchestrator 140 to client device 150, allowing functionality of orchestrator 140 to be directly invoked by client device 150. For example, methods of orchestrator 140 may be invoked remotely via API gateway 142 by client device 150 via network messages (e.g., HTTP requests, XML requests, JSON requests). In an example, orchestrator 140 acts as a public network facing security gateway preventing client device 150 from directly accessing a plurality of computing components in system 100 behind orchestrator 140 directly (e.g., orchestrators 172, 174, 176, and 178). In the example, API gateway 182, 184, 186, and 188 provide similar functionality to API gateway 142, but to their respective orchestrators 172, 174, 176, and 178.

In an example, orchestrator 140 is a current version (or latest updated version) of a container orchestrator implemented by system 100. In the example, orchestrators 172, 174, 176, and/or 178 are older versions of the same container orchestrator as orchestrator 140. For example, orchestrator 140 may be an updated version of orchestrator 172, which may have been an immediately previous version of orchestrator 140 patched for security reasons. In an example, in various versions of orchestrators 140, 172, 174, 176, and 178, different API functionality has been added and removed. In the example, an application executed for client device 150 on the distributed computing system managed by orchestrator 140 may require at least one API call that has been deprecated in orchestrator 140, for example, due to being replaced with a more efficient computing module or due to a network security risk presented by the API call. In an example, while orchestrator 140 no longer has access to the deprecated API call directly, orchestrator 140 hosts a plurality of previous versions that do have the functionality available (e.g., orchestrators 172, 174, 176, and/or 178). In an example, orchestrators 172, 174, 176, and/or 178 may be referred to as child orchestrators or child programs, services, or applications of a parent orchestrator 140. In the example, API interpreter 144 determines which, if any of the orchestrators 172, 174, 176, and/or 178 may handle the deprecated API call. In an example, security concerns may be alleviated because orchestrator 140 is patched to prevent the exploit of the discovered vulnerability, and therefore the requests passed through, for example, to API gateway 182, are secured against exploitation while enabled for legitimate functionality. In an example, orchestrators 172, 174, 176, and/or 178 may be deployed as stripped down versions of full orchestrators. For example, orchestrators 172, 174, 176, and/or 178 may be stripped of the components required to manage a distributed virtualization environment (e.g., scheduler components), which tasks may be handled by orchestrator 140, and may instead primarily execute their respective API servers exposed via API gateways 182, 184, 186, and 188. In an example, if none of orchestrators 172, 174, 176, and 178 are configured to handle a particular request that is unsupported by orchestrator 140, an error may be returned to the requestor. In another example, orchestrator 140 may instantiate a new child orchestrator to handle the request.

In an example, client device 150 may be any form of network accessible device (e.g., phone, tablet, laptop, desktop, server, Internet of Things ("IOT") device, etc.) connected to system 100 through network 105. In an example, client device 150 may have its own processors, memories, I/Os, and/or OS similar to physical hosts 110A-B. In an example, client device 150 accessing system 100 may connect to a network facing component such as a network gateway, which may be associated with orchestrator 140. In the example, the network gateway or load balancer may route requests from client device 150 to appropriate computing resources (e.g., orchestrators 172, 174, 176, 178, API gateways 142, 182, 184, 186, 188) for handling the requests. In an example, a Domain Name Server ("DNS") may resolve an internet address into an Internet Protocol ("IP") address for the associated network gateway, web portal, or load balancer. In an example, a user of client device 150 may log into an account to access services provided by the virtualized computing environment. In an example, orchestrator 140 may provide client device 150 with direct access to computing features supported by orchestrator 140 via API gateway 142 (e.g., features available in a current version of the orchestrator). In the example, orchestrator 140 and API gateway 142 may pass on requests to API interpreter 144, for example, where the requests are unsupported in the current version of the orchestrator, and may instead determine an appropriate orchestrator (e.g., orchestrator 172, 174, 176, and/or 178) with their respective API gateways 182, 184, 186, or 188 to handle the request. In an example, additional orchestrator versions may be instantiated by orchestrator 140 to fulfill a particular request, for example, where none of orchestrators 172, 174, 176, and 178 support the request. In another example, such requests are rejected.

Figure 2:
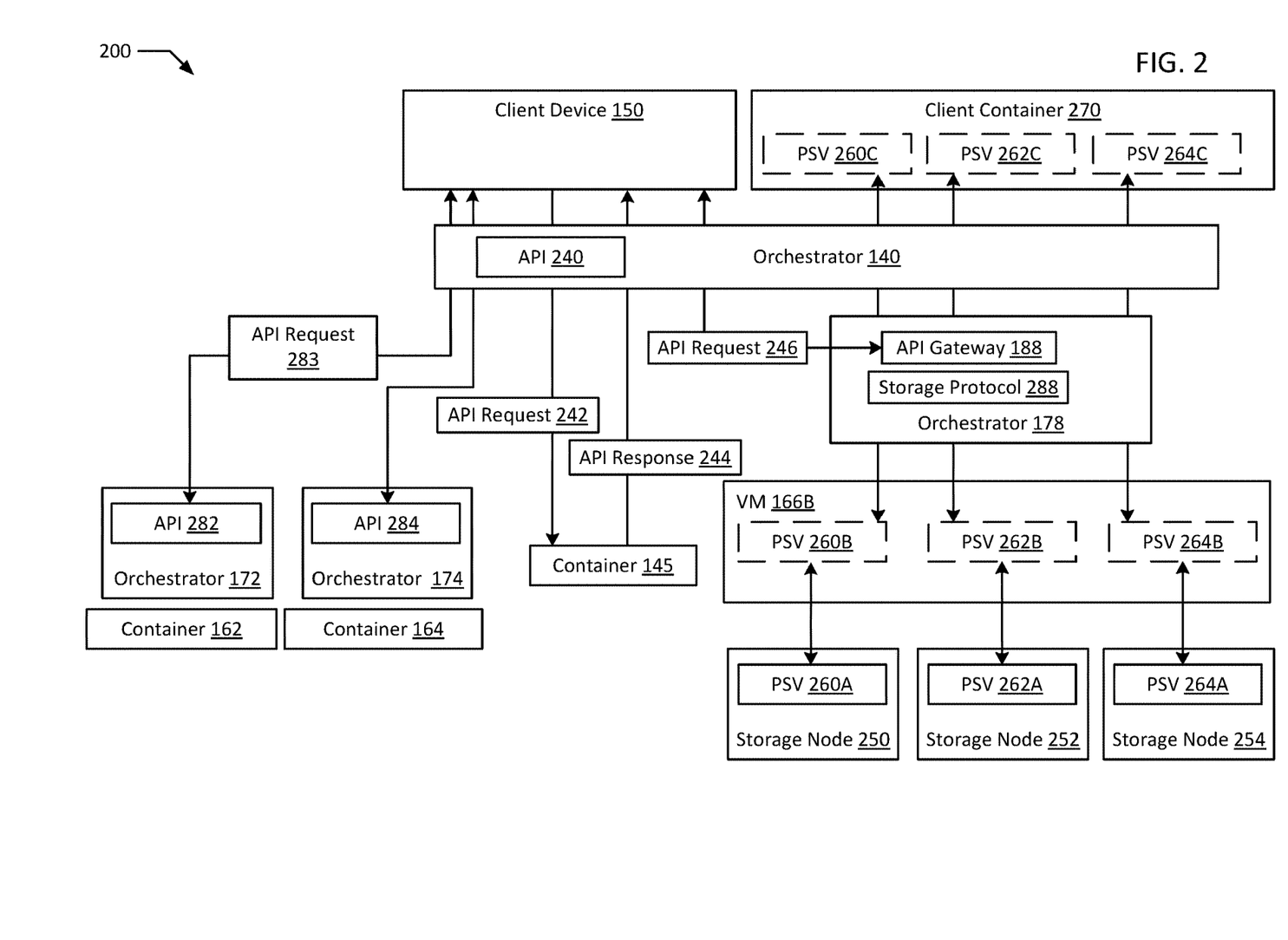
FIG. 2 is a block diagram illustrating the handling of legacy requests in secure backwards compatible orchestration system for isolated guests according to an example of the present disclosure.

FIG. 2 is a block diagram illustrating the handling of legacy requests in secure backwards compatible orchestration system for isolated guests according to an example of the present disclosure. In an example, illustrated system 200 in FIG. 2 is a breakdown of various potential interactions between client device 150 and system 100. In illustrated system 200, orchestrator 140 receives various API requests (e.g., API request 242, 246, 283, etc.) and passes them on to another component to handle the respective requests as illustrated by the vertical lines passing through orchestrator 140. In an example, client device 150 requests orchestrator 140 to instantiate a new client container 270 for a compute task (e.g., to search for an archived data record) via API request 242 sent to API 240 of orchestrator 140, for example, through API gateway 142. In the example, orchestrator 140 may handle the instantiation of client container 270, so API request 242 remains on container 145 and is handled by orchestrator 140. In the example, client device 150 receives API response 244 notifying client device 150 that client container 270 has been instantiated, along with connection information to client container 270.

In an example, client device 150 may send a second API request 246 indicating that client container 270 requires persistent storage, specifically access to a plurality of legacy persistent storage volumes with data required by client container 270. In an example, a driver and/or protocol required for accessing these legacy persistent storage volumes (e.g., PSVs 260A, 262A, 264A) may be unavailable, retired, and/or deprecated in orchestrator 140. In an example, orchestrator 140 is hosted on container 145 on guest OS 196B, incompatible with PSVs 260A, 262A, and 264A. In an example, orchestrator 140 determines, based on API interpreter 144, that orchestrator 178 supports the legacy PSVs 260A, 262A, 264A. In the example, orchestrator 140 passes client device 150's request 246 on to API gateway 188 for execution. In an example, orchestrator 178 includes storage protocol 288 which has subsequently been deprecated. In an example, storage protocol 288 requires guest operating system 196C, which is incompatible with guest operating system 196B, and therefore orchestrator 178 is required to execute on VM 166B separate from VM 166A. In an example, via storage protocol 288, orchestrator 178 requests to storage nodes 250, 252 and 254 that PSVs 260A, 262A, and 264A be mounted to VM 166B hosting orchestrator 178 as PSVs 260B, 262B, and 264B. In an example, storage nodes 250, 252 and 254 may be any type of persistent storage (e.g., NAS, SAN, etc.) accessible to system 100, including, for example, distributed storage solutions such as Red Hat® Ceph®, OpenStack® Swift, Amazon S3®, etc. In an example, orchestrator 178 and/or orchestrator 140 include a component enabling conversion between PSVs 260B, 262B, and/or 264B which may require storage protocol 288 and storage protocols accessible and available to orchestrator 140. In an example, storage protocol 288 has been deprecated for a more efficient storage protocol in orchestrator 140, and client container 270 may have access to the storage protocols available to orchestrator 140 but not storage protocol 288. In an example, client container 250 mounts persistent storage volumes 260C, 262C, and 264C with storage protocols available to client container 270 and orchestrator 140. In the example, orchestrator 140, including API interpreter 144, may provide an interface for client container 270 to access storage protocol 288. In another example, client container 270 is a legacy container that implements storage protocol 288. In the example, client container 270 may send storage requests with API calls associated with storage protocol 288 that orchestrator 140 is unable to execute. In the examples, orchestrator 140 determines to forward the API calls to API gateway 188 for execution, for example, based on orchestrator 178 being able to handle the request to mount PSVs 260A, 262A, and 264A.

In an example, client device 150 sends orchestrator 140 an API request 283, which orchestrator 140 determines is incompatible with any currently executing orchestrator (e.g., orchestrators 140, 172, 174, 176, and 178). For example, API request 283 may be a request from a version 3.1 beta of the orchestrator API. In the example, orchestrator 140 may execute a version 5 of the orchestrator API (e.g., API 250), and may determine that of the currently hosted orchestrators, the nearest matches for version 3.1 beta may be orchestrator 172's API 282 and orchestrator 174's API 284. For example, API 282 may be a version 3.05 production release and API 284 may be a version 4.01 production release. In an example, API 282 (e.g., v3.05 production) may include a version 3.1 alpha release. In the example, API interpreter may determine that version 3.1 alpha included the requested feature and was invoked with an API call with substantially similar syntax such that API request 283 should be compatible with API 282.

In an example, API 282 handles API request 283, and is flagged by API interpreter 144 as the API to send future requests for version 3.1 alpha requests. In an example, API 282 handles additional requests from client device 150. However, on a later request, orchestrator 172 is incapable of handling a request from client device 150. For example, certain changes implemented between version 3.1 alpha and version 3.1 beta removed the later requested API functionality from the version 3.1 beta. In an example, instead of being removed, the syntax for invoking the functionality may have been changed. In an example, upon failure, orchestrator 172 may notify orchestrator 140 of the failure. In an example, orchestrator 172 may forward the request to another orchestrator executing a newer or older version of the API (e.g., API 250, 282, 284) to attempt to execute the failed API call. In an example, orchestrator 140 may perform the forwarding instead. In an example, API 284 of orchestrator 174 is capable of handling the request, for example, due to the syntax rejected by API 282 being reinstated as valid syntax based on the demands of the user base. In another example, API 284 also fails to handle the request and client device 150 is notified that the request is no longer supported.

Figure 3:
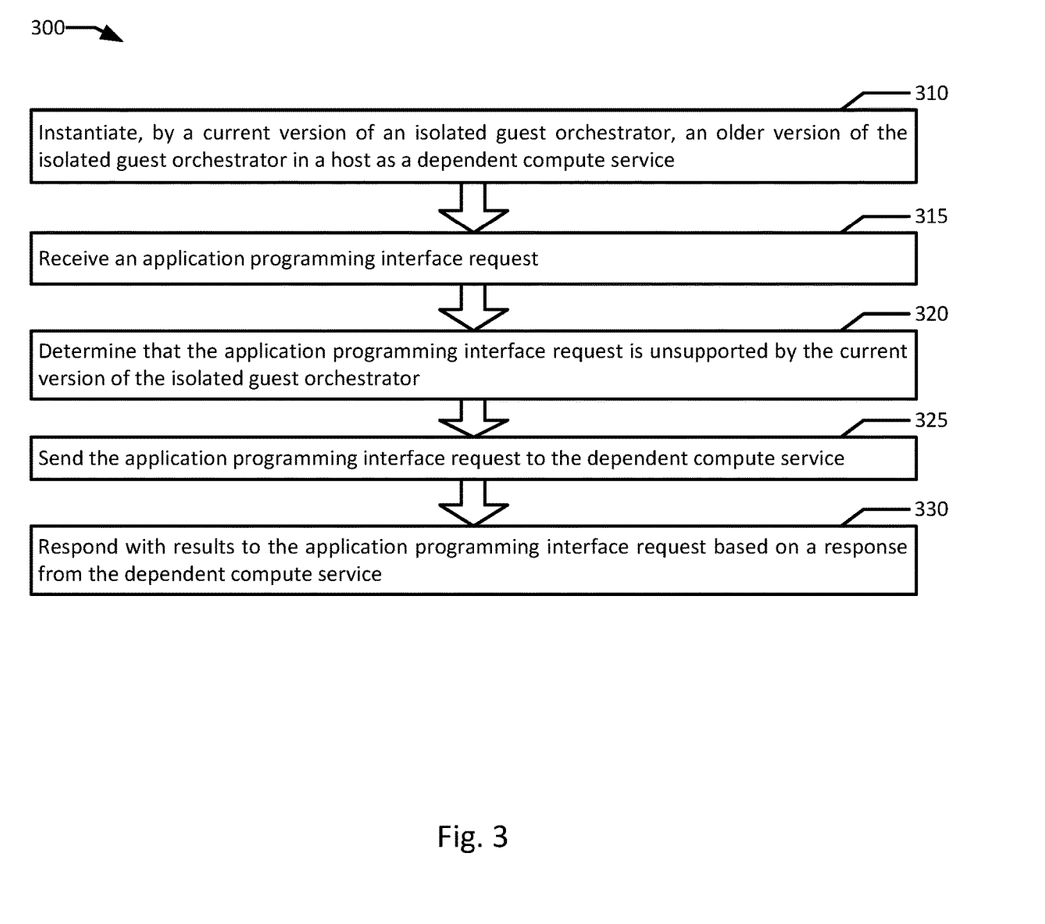
FIG. 3 is flowchart illustrating an example of secure backwards compatible orchestration of isolated guests according to an example of the present disclosure.

FIG. 3 is flowchart illustrating an example of secure backwards compatible orchestration of isolated guests according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by an orchestrator 140.

Example method 300 may begin instantiating, by a current version of an isolated guest orchestrator, an older version of the isolated guest orchestrator in a host as a dependent compute service (block 310). In an example, orchestrator 140 instantiates orchestrators 172, 174, 176, and 178 as dependent compute services on containers 162, 164 and VMs 166A-B acting as hosts for the respective orchestrators 172, 174, 176, and 178. In an example, orchestrator 140 executes in a container 145 while orchestrators 176 and 178 execute in VMs, for example, due to operating system incompatibility and/or driver incompatibility. In an example, rather than being a deprecated version of orchestrator 140, one of the dependent orchestrators (e.g., orchestrators 172, 174, 176, and 178) may instead be a current version of orchestrator 140 configured for compatibility with a different operating system (e.g., Red Hat Enterprise Linux®, Microsoft Windows®, macOS X® etc.) and/or hardware architecture (x86, ARM, etc.). In such examples, such alternative current versions of the orchestrator may provide additional current compatibility rather than providing backwards compatibility, or both.

An application programming interface request is received (block 315). For example, a request to mount a legacy persistent storage volume is received. In the example, data in the legacy persistent storage volume is a required input for an application, for example, to audit the old data records in the legacy persistent storage volume. In an example, API gateway 142 implements updated network security protocols and security bug fixes unavailable on orchestrators 172, 174, 176, and/or 178. For example, a component of 172, 174, 176, and/or 178 may present a security risk if directly accessible to client device 150 over network 105. For example, storage protocol 288 may include a vulnerability that may be exploited to access unauthorized data. In the example, orchestrator 140 may prevent such unauthorized access even where a request needs to be redirected to API gateway 188 and storage protocol 288.

The application programming interface request is determined to be unsupported by the current version of the isolated guest orchestrator (block 320). In an example, API gateway 142 may determine that an API request (e.g., API request 246 or 283) is unsupported by orchestrator 140 executing a current version of orchestrator code. For example, API gateway 142 may determine that API request 246 or 283 utilizes an unrecognized API call or syntax. In an example, such requests are sent to API interpreter 144 to determine whether any of the dependent compute services associated with orchestrator 140 may handle the request.

The application programming interface request is sent to the dependent compute service (block 325). In an example, orchestrator 140 sends the unsupported ad request (e.g., ad request 246 or 283) to dependent compute services (e.g., orchestrators 178, 172). In an example, orchestrator 178 connects to a computing device that is incompatible with orchestrator 140. For example, storage nodes 250, 252 and/or 254 may require a storage driver (e.g., storage protocol 288) that is unavailable on orchestrator 140. In an example, an operating system component and/or hardware component of VM 166B is required that is unsupported by VM 166A, container 145, and/or orchestrator 140. In an example, a connection between VM 166B and storage node 250, 252, and/or 254 is kept open for at least the duration of client device 150 and/or client container 270's session duration with system 200. For example, API request 246 to mount PSVs 260A, 262A, and 264A may be complete when PSVs 260B, 262B, and 264B are mounted to VM 166B, or when PSVs 260C, 262C, and 264C are mounted to client container 270. However, the connections between VM 166B and storage nodes 250, 252, and 254 may be kept open to allow continued access to the PSVs 260A, 262A, and 264A. In an example, orchestrator 140 and/or orchestrator 178 provide translation between client container 270s' storage requests and storage controllers of respective storage nodes 250, 252, and 254. In an example, orchestrator 140 and/or orchestrator 178 may instantiate an additional guest (e.g., another container in a cluster providing the functionality of orchestrator 140) to track legacy storage volume connections (e.g., connections between client container 270 and PSVs 260A, 262A, and 264A, as well as to translate messages as necessary between client container 270 requests and storage protocol 288.

The orchestrator responds with results to the application programming interface request based on a response from the dependent compute service (block 330). In an example, after processing API request 246 (e.g., via orchestrator 178), orchestrator 140 reports the results of the processing (e.g., mounting instructions for PSVs 260A, 262A, and 264A) to client device 150 and/or client container 270.

In an example, API request 283 is then received by orchestrator 140, and orchestrator 140 determines (e.g., based on API interpreter 144), that API request 283 is unsupported by any of containers 172, 174, 176, and 178. In an example, orchestrator 140 determines a version of the orchestrator may be instantiated to execute the API request 283. However, an extra orchestrator instance may present significant computing overhead and may not be an optimal solution. For example, if an orchestrator is frequently updated, and most API changes are reserved for major releases of the orchestrator, launching potentially hundreds of child orchestrators, the vast majority of which are only utilized extremely rarely may present a waste of computing resources. In the example, orchestrator 140 may be configured to only instantiate major releases of alternative orchestrator versions. In an example, a number of orchestrator versions and/or granularity of release versions between orchestrator versions instantiated by orchestrator 140 as dependent compute services may be configurable. In another example, an image file for a corresponding version of the orchestrator may be unavailable to orchestrator 140.

In an example, orchestrator 140 determines that API request 283 is in a format associated with an orchestrator release between that of the orchestrator versions of orchestrators 172 and 174, for example, based on metadata in API request 283. In another example, client device 150 specifically requests a version of the orchestrator API that is between the versions of APIs 282 and 284. In an example, API request 283 is determined to have a syntax compatible with API 282 and therefore API request 283 is sent to API 282 for handling. In an example, based on whether API request 282 successfully handles API request 283, orchestrator 140 determines whether to send further requests for the API versioning in API request 283 to API 282 of orchestrator 172. In an example, a further request of the same versioning as API request 283 is unable to be handled by API 282 and a rejection of the request is sent to client device 150. In an example, orchestrator 174's API 284 is able to successfully handle the request.

Figure 4:
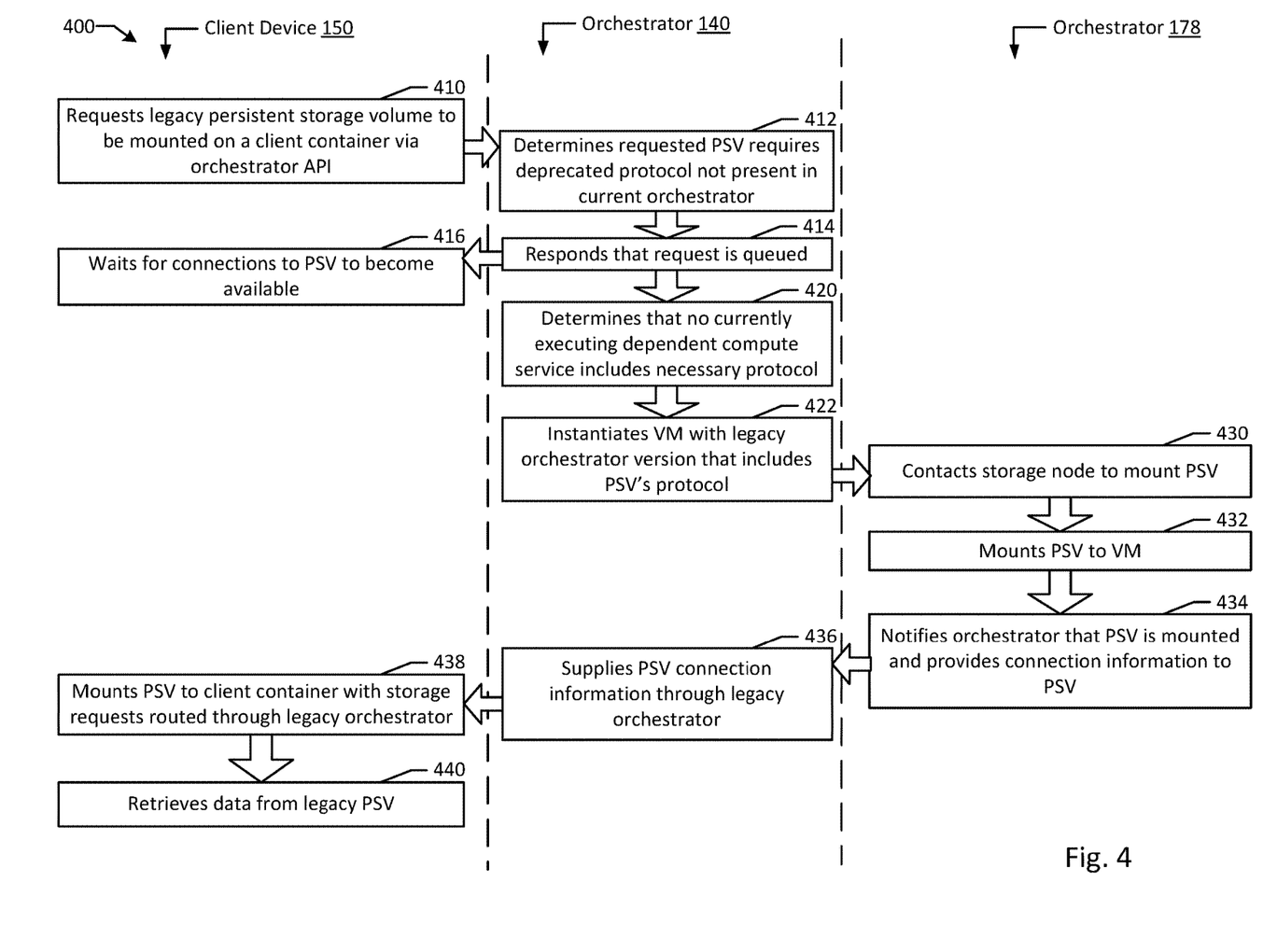
FIG. 4 is flow diagram of an example of accessing legacy devices in a secure backwards compatible orchestration system for isolated guests according to an example of the present disclosure.

FIG. 4 is flow diagram of an example of accessing legacy devices in a secure backwards compatible orchestration system for isolated guests according to an example of the present disclosure. Although the examples below are described with reference to the flow diagram illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, orchestrator 140 coordinates access to a legacy storage device for client device 150 through orchestrator 176.

In example system 400, client device 150 begins by requesting legacy persistent storage volumes 260A, 262A, and 264A to be mounted to client container 270 via orchestrator 140's API gateway 142 (block 410). In the example, orchestrator 140 determines that the requested PSVs 260A, 262A, and 264A require a deprecated storage protocol 288 that is no longer supported in orchestrator 140's current version, for example, due to a more efficient protocol being introduced for new storage volumes (block 412). In an example, orchestrator 140 responds to client device 150 that the request is queued to determine how best to proceed (block 414). In the example, client device 150 waits for connection information to the PSVs to become available (block 416).

In an example, orchestrator 140 determines that no currently executing orchestrator acting as a dependent compute service under orchestrator 140 includes the necessary storage protocol 288 (block 420). In the example, orchestrator 140 instantiates a new VM 166B with legacy orchestrator 178 that includes the requested storage protocol 288 (block 422). In an example, a new VM is required because storage protocol 288 may be an operating system component that has been deprecated in newer operating system versions. In such an example, guest OS 196B on which container 145 and orchestrator 140 execute may be a newer version of guest OS 196C. In an example, orchestrator 178, after being instantiated, contacts storage nodes 250, 252, and 254 to mount PSVs 260A, 262A, and 264A (block 430). In an example, orchestrator 178 mounts the requested PSVs to VM 166B where required storage protocol 288 is available (block 432). In the example, orchestrator 178 notifies orchestrator 140 that the PSVs 260A, 262A, and 264A are mounted as PSVs 260B, 262B, and 264B and provides connection information to the virtualized links to PSVs 260A, 262A, and 264A in the form of PSVs 260B, 262B, and 264B on VM 166B (block 434). In an example, orchestrator 140 supplies connection information to PSVs 260B, 262B, and 264B through legacy orchestrator 178 and VM 166B to client device 150 (block 436). In the example, client device 150 mounts the PSVs 260B, 262B, and 264B to container 270 as PSVs 260C, 262C, and 264C with requests for storage routed through orchestrator 178 (block 438). In an example, client device 150 retrieves data from PSVs 260A, 262A, and 264A (block 440).

Figure 5:
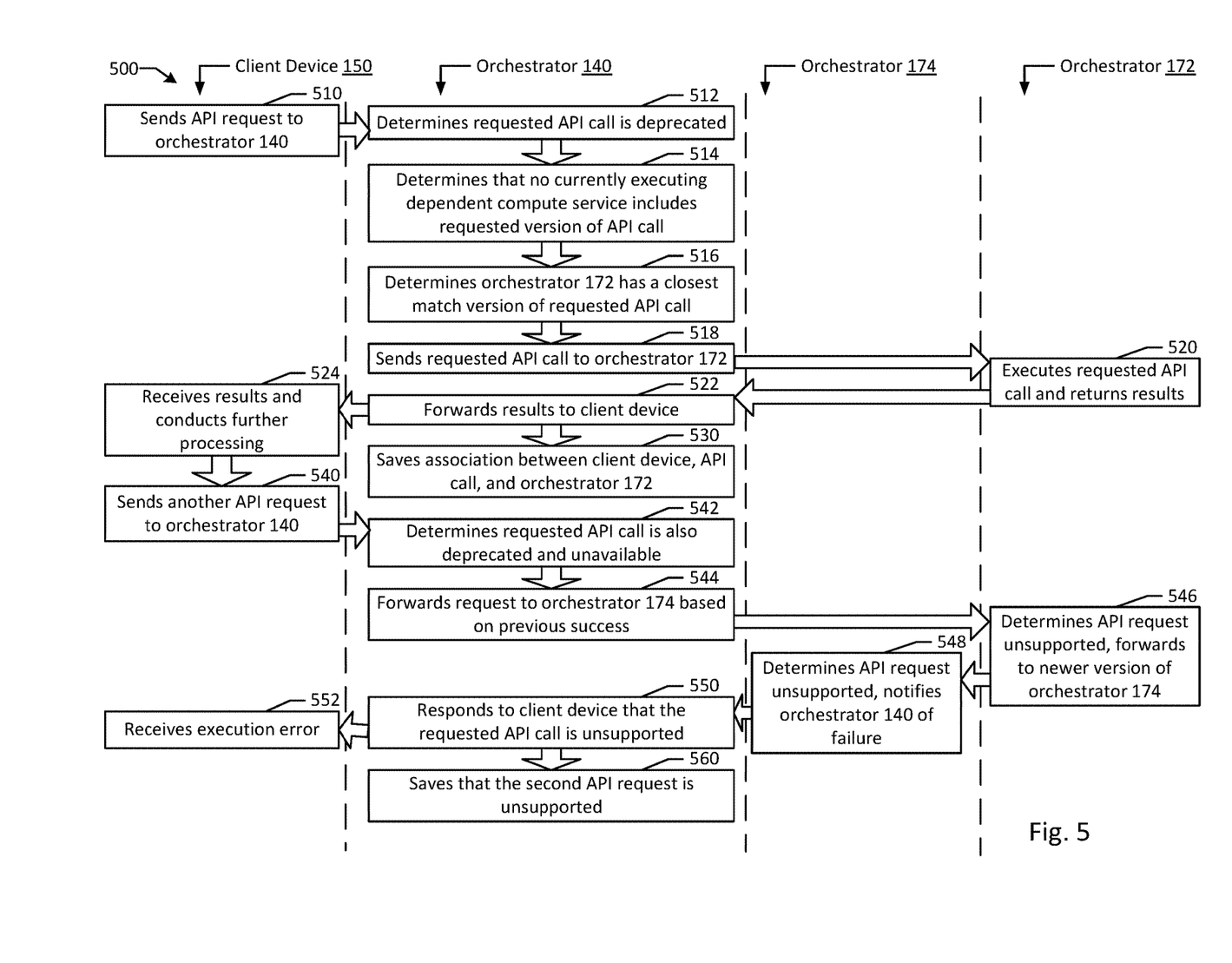
FIG. 5 is flow diagram of an example of handling unsupported requests in a secure backwards compatible orchestration system for isolated guests according to an example of the present disclosure.

FIG. 5 is flow diagram of an example of handling unsupported requests in a secure backwards compatible orchestration system for isolated guests according to an example of the present disclosure. Although the examples below are described with reference to the flow diagram illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, orchestrator 140 coordinates the execution of legacy API calls for client device 150 through orchestrators 172 and 174.

In example system 500, client device 150 begins by sending API request 283 to orchestrator 140 (block 510). For example, API request 283 may be a request for a version 3.1 beta API call to generate a report of all currently active guests in system 200 belonging to client device 150. In an example, orchestrator 140 determines that the requested API call is deprecated (block 512). For example, a different reporting method has been substituted in newer releases such as orchestrator 140 executing version 5 of the API. In the example, orchestrator 140 determines that no currently executing dependent compute service (e.g., orchestrators 172, 174, 176, and 178) includes a version 3.1 beta API (block 514). In an example, a reporting request is configured to be less important than a request to access storage nodes, and is therefore determined not to warrant the overhead of instantiating a new orchestrator as a dependent computing service. In the example, orchestrator 140 determines that orchestrator 172 executing a version 3.05 production release of the API includes support for version 3.1 alpha, which is the nearest available match to version 3.1 beta currently available (block 516). In an example, orchestrator 140 sends API request 283 to orchestrator 172 to handle (block 518). In an example, orchestrator 172 executes the requested API call and returns the requested report (block 520). In the example, orchestrator 140 forwards the resulting report to client device 150 (block 522). In the example, client device 150 receives the report and conducts further processing (e.g., performance analysis) based on the report (block 524). In the example, orchestrator 140 saves the successful association between client device 150, orchestrator 172, and the requested reporting API call of API request 283 (block 530).

In an example, client device 150 sends another API request to orchestrator 540 after processing the report (block 540). In the example, orchestrator 140 determines that the second API call is also deprecated and unavailable (block 542). In the example, orchestrator 140 forwards the new API request to orchestrator 172 based on orchestrator 172 previously handling API request 283 from client device 150 (block 544). For example, it is determined that client device 150 was coded contemporaneously with the API version available on orchestrator 172 based on API request 283 and other requests from client device 150. In an example, the second request is a request to adjust a routing and/or load balancing protocol between various guests of client device 150. Orchestrator 172 may determine that the new API request is unsupported by orchestrator 172, the request being in an unrecognized syntax, and orchestrator 172 therefore forwards the request to the next newer version of the API (e.g., API 284) on orchestrator 174 (block 546). In an example, orchestrator 174 also cannot support the new API request, for example, because the specific requested routing and load balancing pattern is unavailable to orchestrator 174, and therefore orchestrator 174 notifies orchestrator 140 of the failure (block 548). In an example, orchestrator 140 responds to client device 150 that the requested API call is unsupported (block 550). In the example, client device 150 receives an execution error (block 552). In the example, orchestrator 140 saves that the second API request is unsupported among the currently available dependent compute services (block 560).

Figure 6:
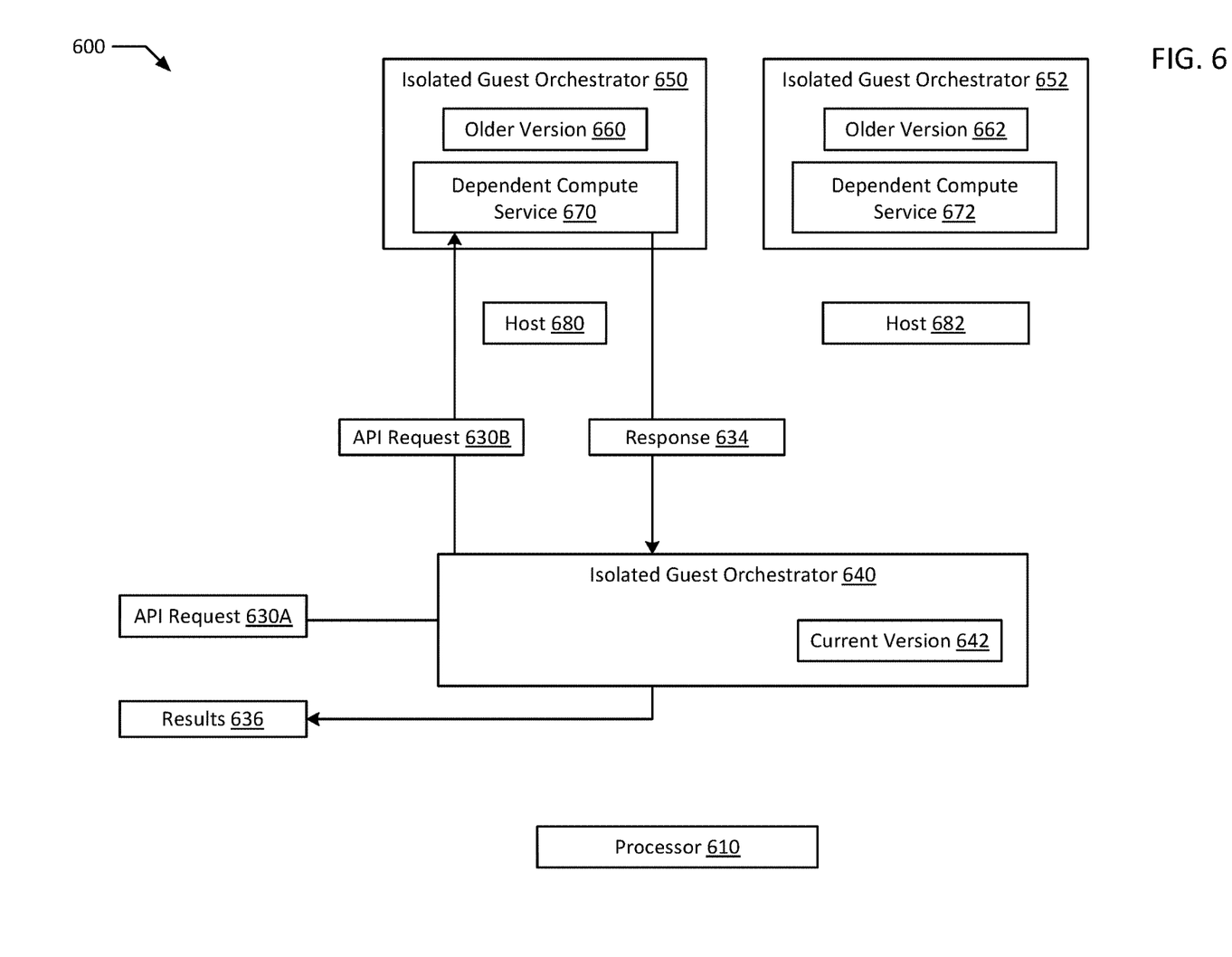
FIG. 6 is block diagram of an example of a secure backwards compatible orchestration system for isolated guests according to an example of the present disclosure.

FIG. 6 is block diagram of an example of a secure backwards compatible orchestration system for isolated guests according to an example of the present disclosure. Example system 600 includes current version 642 of isolated guest orchestrator 640 executing processor 610. Older versions 660 and 662 of isolated guest orchestrators 650 and 652 are instantiated on hosts 680 and 682 as dependent compute services 670 and 672. API request 630A is received and determined to be unsupported by current version 642 of isolated guest orchestrator 640. API request 630A is sent to dependent compute service 670. API request 630A is responded to with results 636 based on response 634 from dependent compute service 670.

Secure backwards compatible isolated guest orchestration enables the life cycles of existing hardware and software components in a computing system to be extended for minimum overhead costs. For example, a frequent driver to terminate and make obsolete legacy components is potential security vulnerabilities provided by such components. With an updated gateway intercepting potential security concerns, legacy versions of applications may be safely executed behind the current gateway while providing support for legacy dependencies. For example, in many enterprise environments, a myriad of cross dependent applications result in long development cycles, as the consequences of an unforeseen error may be costly financially or even may result in deadly consequences (e.g., in a hospital setting). By enabling high level, outward facing APIs such as those for virtualization orchestrators to retain backwards compatibility while at the same time being updated for new features and for security patching, pressure to update back end systems may be significantly reduced. In addition, especially in the context of storage and legacy no longer supported hardware components, there may be no realistic upgrade option, but such tools may need to be kept in operation. For example, software controlling industrial machinery may receive few if any updates, but the machinery may be functional for many decades. Allowing for these legacy components to be controlled by partially isolated virtualized dependent compute services enables their continued use while still providing a level of security against unauthorized access. Since legacy system usage is typically a relatively small portion of total computing usage, enabling shared infrastructure to be implemented to cover these use cases also significantly reduces the potential need for wasted computing resources maintaining dedicated legacy computing infrastructure, resulting in savings to heat generation, energy consumption, and data center usage.

It will be appreciated that the disclosed methods and procedures are applicable beyond virtualization orchestrators and may be implemented to add backwards compatibility to a variety of computing tasks where agile updating of production systems, for example, due to security concerns is required.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
one or more processors executing a current version of an isolates guest orchestrator to:
instantiate a plurality of older versions of the isolated guest orchestrator in a respective plurality of hosts as a respective plurality of dependent compute services, including a first dependent compute service and a second dependent compute service;
receive a first application programming interface request;
determine, by an Application Programming Interface (API) gateway, that the first application programming interface request is unsupported by the current version of the isolated guest orchestrator;
in response to determining that the first application programming interface request is unsupported by the current version of the isolated guest orchestrator, determine the first dependent compute service as a nearest matching dependent compute service;
send the first application programming interface request to the first dependent compute service; and respond with results to the first application programming interface request based on a response from the first dependent compute service.

2. The system of claim 1, wherein the at least one computing component remains connected to the first dependent compute service after executing the first application programming interface request.

3. The system of claim 2, wherein a connection is established to the at least one computing component from a requestor of the first application programming interface request with at least one of the first dependent compute service and the current version of the isolated guest orchestrator translating messages between the requestor and the at least one computing component.

4. The system of claim 3, wherein the at least one computing component is a persistent storage volume.

5. The system of claim 1, wherein the current version of the isolated guest orchestrator executes in a container and at least one dependent compute service of the plurality of dependent compute services executes in a virtual machine.

6. The system of claim 1, wherein the second dependent compute service executes on an operating system incompatible with the current version of the isolated guest orchestrator.

7. The system of claim 1, wherein a second application programming interface request is unsupported by each of the plurality of dependent compute services.

8. The system of claim 7, wherein a third dependent compute service is added to the plurality of dependent compute services to execute the second application programming interface request.

9. The system of claim 7, wherein the current version of the isolated guest orchestrator sends the second application programming interface request to the first dependent compute service after determining that the first dependent compute service supports a third application programming interface request that is one of newer and older than the second application programming interface request, wherein the third application programming interface request has a compatible syntax with the second application programming interface request.

10. The system of claim 9, wherein the current version of the isolated guest orchestrator sends a third application programming interface request to one of the first dependent compute service and the second dependent compute service based on whether the first dependent compute service handled the second application programming interface request.

11. A method comprising:
instantiating, by a current version of an isolated guest orchestrator, a plurality of older versions of the isolated guest orchestrator in a respective plurality of hosts as a respective plurality of dependent compute services, including a first dependent compute service and a second dependent compute service;
receiving a first application programming interface request;
determining, by an Application Programming Interface (API) gateway, that the first application programming interface request is unsupported by the current version of the isolated guest orchestrator;
in response to determining that the first application programming interface request is unsupported by the current version of the isolated guest orchestrator, determining the first dependent compute service as a nearest matching dependent compute service;
sending the first application programming interface request to the first dependent compute service; and
responding with results to the first application programming interface request based on a response from the first dependent compute service.

12. The method of claim 11, further comprising:
translating messages between a requestor of the first application programming interface request and the at least one computing component by at least one of the first dependent compute service and the current version of the isolated guest orchestrator.

13. The method of claim 12, wherein the at least one computing component is a network attached storage device.

14. The method of claim 11, wherein the current version of the isolated guest orchestrator executes in a container executing a first operating system and the second dependent compute service executes on a second operating system incompatible with the first operating system.

15. The method of claim 11, wherein a second application programming interface request is unsupported by each of the plurality of dependent compute services.

16. The method of claim 15, further comprising:
determining that the first dependent compute service supports a third application programming interface request that is one of newer and older than the second application programming interface request, wherein the third application programming interface request has a compatible syntax with the second application programming interface request; and
sending the second application programing interface request to the first dependent compute service.

17. The method of claim 16, wherein the current version of the isolated guest orchestrator sends a third application programming interface request to one of the first dependent compute service and the second dependent compute service based on whether the first dependent compute service handled the second application programming interface request.

18. A computer-readable non-transitory storage medium storing executable instructions, which when executed by a computer system, cause the computer system to:
instantiate, by a current version of an isolated guest orchestrator, an older version of the isolated guest orchestrator in a host as a dependent compute service;
receive an application programming interface request;
determine, by an Application Programming Interface (API) gateway, that the application programming interface request is unsupported by the current version of the isolated guest orchestrator;
in response to determining that the first application programming interface request is unsupported by the current version of the isolated guest orchestrator, determine the first dependent compute service as a nearest matching dependent compute service;
send the application programming interface request to the dependent compute service; and
respond with results to the application programming interface request based on a response from the dependent compute service.

* * * * *

UNITED STATES PATENT AND TRADEMARK OFFICE
CERTIFICATE OF CORRECTION

PATENT NO. : 10,747,599 B2
APPLICATION NO. : 15/984523
DATED : August 18, 2020
INVENTOR(S) : Chen Page 1 of 1

It is certified that error appears in the above-identified patent and that said Letters Patent is hereby corrected as shown below:

In the Specification

In Column 4, Line 66, replace "FreeB SD® Jails" with --FreeBSD® Jails--.

In the Claims

In Column 14, Line 49 (Claim 1), replace "isolates" with --isolated--.

Signed and Sealed this
Third Day of November, 2020

Andrei Iancu
*Director of the United States Patent and Trademark Office*